Sept. 14, 1926.

J. A. WELSAND

CLIMBER'S BELT

Filed August 28, 1925   2 Sheets-Sheet 1

1,600,027

INVENTOR.
John A. Welsand
BY
Erwin, Wheeler & Woolard
ATTORNEYS

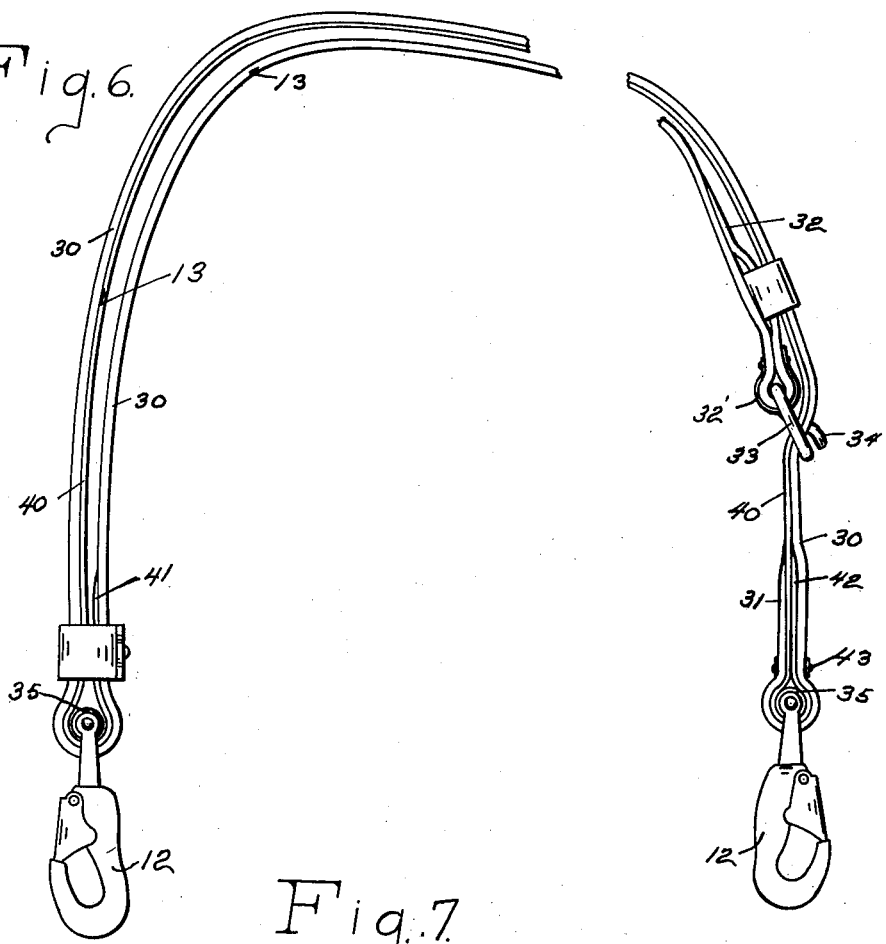

Patented Sept. 14, 1926.

1,600,027

UNITED STATES PATENT OFFICE.

JOHN A. WELSAND, OF WEST ALLIS, WISCONSIN.

CLIMBER'S BELT.

Application filed August 28, 1925. Serial No. 53,189.

This invention relates to improvements in climbers' belts.

It is the primary object of this invention to provide a belt and safety strap assembly affording greater safety to the wearer than any device of this character previously known. More particularly stated, it is my purpose to make a belt which, by reason of the character of the leather used in its manufacture, will have increased tensile strength, will be fire resistant to the point of being uninjured by temporary exposure to intense heat, and will be comparatively non-yielding.

Ordinary leather such as is commonly used in the manufacture of safety belts for climbers is readily injured by fire, but the injury is practically imperceptible to the eye. The result of a burn is to destroy utterly the tensile strength of a belt while leaving its surface substantially intact. The burning of safety belt and safety strap assemblies is a frequent occurrence inasmuch as linemen and others who make a practice of wearing these belts generally find it convenient to carry their safety strap hanging from one of the D rings of the belt or girdle. In this position the intermediate portion of the safety strap is at a height where it may and frequently does dangle over a charcoal furnace or gasoline torch such as is used for heating soldering irons, etc. A large number of injuries have occurred because of burns thus sustained by safety straps and which, because of the peculiar character of the leather, are not visually perceptible and are discovered only when the leather breaks under slight strains which unburned leather would readily sustain.

I have discovered that the horsehide or cowhide usually used in belts of this character is peculiarly subject to being burned by reason of the fact that it is tanned in oil. I have discovered furthermore that chemically tanned leather, or chrome leather as it is known to the trade, is comparatively fireproof and is substantially unaffected by heat conditions which would totally destroy the tensile strength of a harness leather belt or strap. The chrome leather is an extremely soft leather, however, and has not the body which is required in a safety belt in order that the portions of the wearer's frame, which are encircled by the belt, may repose comfortably in the belt under load. Accordingly, as more fully disclosed hereinafter, I prefer to make up my improved belt in a plurality of plies, one of which is chrome leather and the other of which is some relatively inflexible and substantial leather adapted to stiffen and maintain the shape of the chrome leather.

In the drawings:

Figure 6 is a detail view in plan of a safety strap forming part of an improved belt assembly embodying this invention.

Figure 7 is a detail view of the buckle of such strap.

Like parts are identified by the same reference characters throughout the several views.

Figure 1:
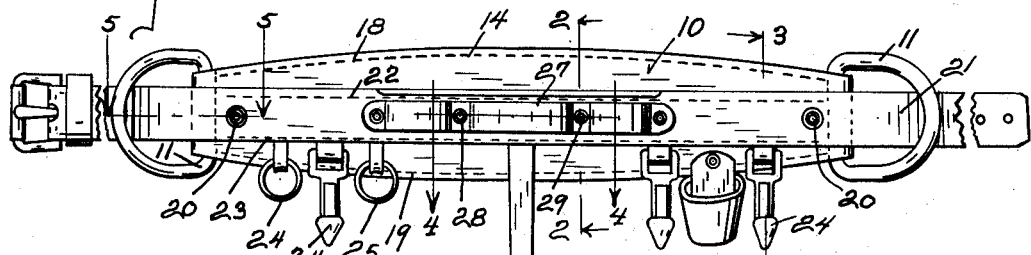
Figure 1 is a rear elevation of a girdle forming a part of a belt assembly embodying this invention.

A safety belt assembly is made up of two parts which are well known in the art and which are separately illustrated on sheets 1 and 2 of the drawings. The parts illustrated on sheet 1 of the drawings all relate to the girdle or body-encircling portion of the apparatus, whereas the parts shown on sheet 2 of the drawings embody a like principle as applied to the pole encircling member or safety strap.

*Body encircling member.*

The body encircling member or girdle is made up of a broad two-ply member 10 which passes about the small of the wearer's back and terminates in the D-rings 11 to which safety hook 12 carried by the safety strap 13 may be secured when the safety strap is in use. Under such circumstances the safety strap, taken with the member 10, constitutes a sling capable of carrying the entire weight of the wearer.

Figure 2:
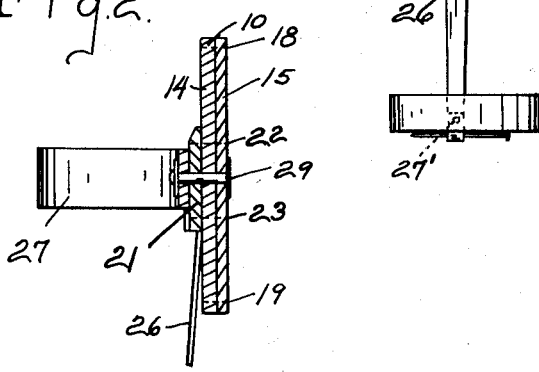
Figure 2 is a section taken on line 2—2 of Figure 1.
Figure 3:
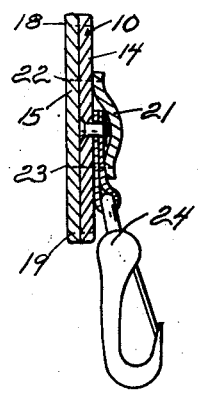
Figure 3 is a section taken on line 3—3 of Figure 1.
Figure 4:
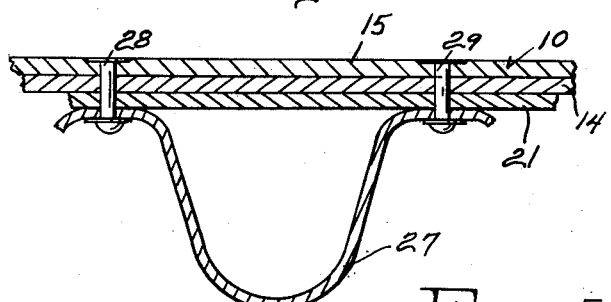
Figure 4 is a section taken on line 4—4 of Figure 1.
Figure 5:
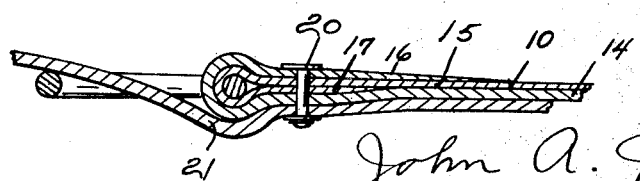
Figure 5 is a section taken on line 5—5 of Figure 1.

As best shown in Figure 2, the member 10 is made up of two plies of leather. The exposed or outer ply 14 is preferably made of ordinary harness leather which, as above indicated, is by no means fire-proof and is sufficiently yielding so that under great strains it stretches or lengthens out. The inner ply or lining 15 for member 10 is made of chrome leather. This leather has very great tensile strength and when properly sewed into the belt will be substantially non-stretchable. In effect I take the stretch out of the chrome leather in advance by cutting the chrome leather ply about two inches shorter than that made of harness leather. While the two plies are stitched together the chrome leather is kept under tension which makes the two plies of substantially like length. Subsequently the chrome leather is comparatively non-stretchable under strains which would greatly increase the length of a like piece of harness leather. Likewise the chrome leather is comparatively fire-proof as above indicated. The plies 14 and 15, which are preferably made of harness leather and chrome leather respectively, are preferably passed about the D rings 11 in opposite directions, as best shown in Figure 5. Thus, if the extremity 16 of the harness leather ply 14 becomes loosened to some extent the extremity 17 of the chrome leather ply will not be correspondingly loosened but will be tightly maintained in engagement by whatever portion of extremity 16 still overlaps it. The two plies are stitched together at 18 and 19 along their corresponding margins and are preferably also secured adjacent the D rings 11 by means of heavy rivets or the like 20 which pass completely through the separate plies and their overlapping extremities, and which also engage the belt strap 21. Additional rows of stitching 22 and 23 preferably pass entirely through both plies of member 10 and through the belt strap.

Various hooks and rings such as those shown at 24 and 25 serve to support tools and are anchored beneath the belt strap 21 in the usual manner. Likewise, a flexible strip of leather 26 is anchored beneath the belt strap and is provided at its end with a portion anchored in reversely folded relation by means of a rivet 27'. The strip 26 may be passed through the central opening in a roll of tape which is held thereon by a nail or the like received through the reversely bent extremity of the strip.

In addition to the tool carrying equipment above noted, there is also a series of pockets formed by a strip of leather 27 riveted at 28 and 29 to the girdle proper and bent outwardly intermediate the points at which it is riveted. This is in accordance with the standard practice, but I have found that the pockets so formed retain permanently their shape in a device made in accordance with this invention, due to the fact that the relatively non-stretchable chrome leather lining at 15 takes all tensile strains and relieves the harness leather ply 14 and the belt strap 21 from such forces as have hitherto tended to stretch them. It will be obvious that when the body encircling portions of the ordinary safety belt become stretched they gradually acquire the same length as the intermediate outwardly folded portion of strip 27 which forms the pockets. The pockets gradually disappear during the lifetime of the belt. Where, however, the belt is lined with chrome leather in accordance with the present invention no stretching occurs and the pockets keep their original contour for an indefinite period.

The belt strap 21 does not ordinarily perform any safety function and is not ordinarily called upon to support the weight of the wearer's body. Its function is merely that of any other belt, and it serves merely to support and position the member 10 so that such member can comfortably transmit to the body the sustaining force of the safety strap 13. As above indicated, the strap 13 and member 10 are both tension members and together are frequently called upon to sustain the wearer's weight.

*Safety strap.*

The safety strap 13 is made up of a continuous length of harness leather 30 which is secured adjacent its end 31 to one of the safety hooks 12 and is provided adjacent its other end 32 with a buckle 33 having a tongue 34 receivable in suitable apertures in the strap member 30. Where the extremity 32 of the strap is folded about the buckle it is preferably anchored not merely by means of a rivet but further by means of a metal re-enforcing member 32' held by the rivet about that portion of the strap which engages the buckle. The ends of the member 32' are of unequal length, as is clearly shown in Figures 6 and 7, the purpose being to avoid the possibility of leather breakage such as would occur if the leather were invariably flexed at the same point in a manner which would be necessitated if the ends of the clip 32' were of equal length.

Intermediate the ends of strap member 30 is the other buckle 12 which is preferably provided with a roller at 35 about which the strap member 30 is folded upon itself. The length of the strap member may be altered by means of buckle 33, and the roller 35 of hook 12 will thereupon adjust itself under tension to the extremity of the fold in the strap member.

Such portions of the strap member as are under heavy tension are preferably lined with a strip of chrome leather 40. One end 41 of this strip of leather is found near the normal position of the fold in which roller 35 is engaged. The other end 42 of the chrome leather lining strip 40 is anchored about the other safety hook 12 and, as in the case of the girdle, the chrome leather ply is preferably passed about its anchorage in the direction opposite to that in which the facing leather extends. A rivet 43 supplements the stitching which holds the two plies together, and it will be noted that the intermediate part of the chrome leather strip or ply 40 passes through buckle 33 and thus receives the tension of the buckle tongue 34.

When both of the hooks 12 are engaged with a single D ring 11, as is frequently the case when the safety strap is not in use, the harness leather strip 30 will hang lowermost and will protect the chrome leather strip from the heat of any charcoal or any gasoline furnace over which the strap may hang. It is thus adapted to protect the chrome leather from the heat. The chrome leather is adequate to sustain all loads for which the belt is adapted and, being unaffected by the heat, both by reason of its inherent fire-proof characteristics and by reason of the protection afforded by the facing strip 30, the chrome leather will remain capable of performing its sustaining function. It has been found that the chrome leather will not be seriously injured unless the facing strip is almost entirely burned away, under which circumstances its condition is readily apparent.

There is no reason why the chrome leather lining 40 should not cover the entire safety strip except for the fact that the results secured by the disclosed construction are not only perfectly satisfactory but have the further advantage that they may be had economically.

It will be obvious that in place of the harness leather which is used in accordance with this invention, it is possible to substitute other materials such as fabric webbing or the like to re-enforce the relatively soft and highly flexible chrome leather. Broadly speaking, it is even possible to substitute other materials for the chrome leather, inasmuch as webbing and the like may be made fire-proof by treatment with suitable chemicals well known for that purpose. When so treated a strip of fabric webbing would have at least the fire-proof characteristics of the chrome leather lining but it is preferred to use the chrome leather in the practice of this invention.

I claim:

1. A safety belt comprising a plurality of plies of leather, the outwardly disposed plies being of form retaining, comparatively rigid leather, and the inner plies being of heat resisting, prestretched chrome leather, so stitched to said outwardly disposed plies as to conform to their shape and at the same time sustain the weight of the body of the wearer.

2. A safety belt comprising a plurality of plies of material including a ply of material of greater tensile strength and fire resistance than oil-tanned leather faced by a ply of relatively inflexible material secured in supporting relation to said first mentioned ply, whereby to be adapted to maintain the shape of the belt.

3. A multi-ply belt comprising a ply of fire resisting chrome leather of greater tensile strength than oil-tanned leather, and a supporting ply of relatively inflexible material stitched to said first mentioned ply substantially throughout its length, whereby said belt partakes substantially unitarily of said qualities of both of said plies.

4. In a device of the character described, the combination with a belt strap, of a relatively non-stretchable lining extending along a portion thereof and connected therewith, and a strip of material arranged in convolutions along said strap and anchored thereto at intervals to provide pockets, said lining being adapted to sustain tension strains to which said strap is subject, whereby to avoid the stretching of said strap in a manner to eliminate said pockets.

JOHN A. WELSAND.